United States Patent [19]

Massimo

[11] Patent Number: 4,994,984

[45] Date of Patent: Feb. 19, 1991

[54] SYSTEM AND DEVICE FOR SUPPLYING DESIRED LIQUID VOLUMES BY MEANS OF A METERING PUMP IN VARIABLE FLOW RATE CONDITION

[75] Inventor: Sanna Massimo, Agrate Brianza, Italy

[73] Assignee: Tecnolab Snc di Sanna Massimo & C., Milan, Italy

[21] Appl. No.: 174,941

[22] Filed: Mar. 29, 1988

[30] Foreign Application Priority Data

Mar. 31, 1987 [IT] Italy .................. 19909 A/87

[51] Int. Cl.$^5$ .................. G01F 1/24; F04B 49/06
[52] U.S. Cl. .................. 364/510; 364/509; 222/71; 417/44; 417/411; 417/410
[58] Field of Search .............. 364/510, 571.01, 571.07, 364/571.08, 465; 417/44, 410, 411, 415; 222/71

[56] References Cited

U.S. PATENT DOCUMENTS

| | | | |
|---|---|---|---|
| 4,277,832 | 7/1981 | Wong | 364/510 |
| 4,702,674 | 10/1987 | Fontaine et al. | 417/44 |
| 4,797,834 | 1/1989 | Honganen et al. | 304/510 |

FOREIGN PATENT DOCUMENTS

| | | | |
|---|---|---|---|
| 0152006 | 9/1982 | Japan | 364/510 |
| 1141377 | 2/1985 | U.S.S.R. | 364/510 |

Primary Examiner—Parshotam S. Lall
Assistant Examiner—V. N. Trans
Attorney, Agent, or Firm—McAulay, Fisher, Nissen & Goldberg

[57] ABSTRACT

For a metering vibrating pump in a variable flow rate condition, a system and a device is provided for supplying desired liquid quantities comprising a memory circuit (36) set by a supply or energization starting signal (38), a counter (24) counting a certain pump stroke number detected by a piston position detector (12) for detecting the position of a piston in the pump, a numerical comparator (28) comparing the numbers emitted by the counter (24) with preset numbers formed by a numerical digital combinator (32) for outputting a reset signal for the memory circuit (36); the memory circuit (36) starts the pump operation when it is set and stops the operation when it is reset.

23 Claims, 6 Drawing Sheets

SYSTEM AND DEVICE FOR SUPPLYING DESIRED LIQUID VOLUMES BY MEANS OF A METERING PUMP IN VARIABLE FLOW RATE CONDITION

BACKGROUND OF THE INVENTION

1. Field of the Invention

The present invention concerns a control device for supplying desired liquid volumes by means of a metering pump even if, owing to external reasons, the flow rate of the pump would be variable.

2. Description of the Prior Art

In many industrial processes connected with automatic processing or packaging, such as automatic filling of containers or cans, and as in many manual or automatic machines for distributing beverages and specifically warm beverages such as coffee percolators and automatic machines for preparing and distributing the warm beverages, there is the problem of supplying desired liquid volumes which are not always equal to each other, but which must be selected every time in a simple and immediate way.

A very simple and primitive but rather precise, method for supplying desired liquid volumes, would be to fill in with the liquid a number of containers having a known capacity and then to draw the liquid from the containers in order to have them completely emptied. This method has the drawback of requiring a certain number of container, having calibrated volume which, when in the case of a wide metering range may be untollerably high, adding encumbrance drawbacks and reducing the metering accuracy because of long connecting ducts introducing hardly evaluable and controllable supplementary capacities. This drawback can be partially overcome by using, just one graduated container (such as a graduated glass) allowing as many different capacities as is the number of graduations on the container. This solution is however less precise in the metering because of unavoidable inaccuracies in calibrating the graduated container and in detecting the liquid level in the container. A more practical method, fully independent from calibrated containers, would be that of using a positive displacement pump such as, for example a piston pump, having a constant stroke length and powered by a motor through a crank and link assembly, calibrated so as to stop after a preset number of strokes, estimated for example by counting, the number of revolutions made by the motor. Such a method can produce rather accurate meterings, but the use of an expensive device such as the positive displacement pump and the problem of carefully stopping the pump at the expected time, adds rather high costs and can lead to such an expensive device which can not be installed in all apparatus, because the expense of such a solution is not always bearable.

A third method is to use piston pumps of the vibrating type comprising an electromagnet provided with a movable core rigidly connected to a piston movable within a cylinder whereby for any displacement of the movable core a like displacement of the piston corresponds thereto. These pumps are also termed "electromagnetic pumps".

In such a kind of pump, in order to cause an alternative displacement of the piston, the coil winding of the electromagnet can be supplied with an alternating current or, better, with an unidirectional pulsating current, such as that obtained by rectifying just a halfwave of a usual a.c. electric current. It is to be pointed out that when a current pulse is applied to the electromagnet of the above mentioned vibrating pump, the movable core is attracted within the electromagnet, causing a suction stroke of the piston and compressing a spring which is thus loaded during the suction stroke and is released when the current through said electromagnet is switched off giving a compression stroke. Thus, if the pump operates under unchanging conditions, i.e. having to overcome always the same resistance due to the backpressure, frictions, dilatations, wears, etc. . , its stroke remains constant and every pump stroke provides a constant liquid flow rate.

Under such ideal conditions, being that the liquid flow is constant for every pump stroke, in order to obtain a desired liquid volume, it is sufficient to calculate the corresponding number of pump strokes and thus the number of current pulses applied to the electromagnet from the desired volume divided by the volume delivered by a single pump stroke.

As a consequence, in order to have a desired liquid volume delivered it is sufficient to apply a corresponding number of current pulses to the pump electromagnet. In order to count the number of current pulses applied to the pump electromagnet, it is sufficient to derivate from the voltage across the electromagnet coil, pulse signals to be counted by a digital counter starting with the first pulse received when a voltage begins to be applied to the electromagnet and, stopping after having counted a pulse number corresponding to the desired volume, care being also taken to stop the voltage application to the electromagnet, whereby the pump does affect just the desired stroke number to obtain the desired liquid volume. This system, by means of which pulses are generated from the network alternating current at the fixed frequency thereof, is basically objectionable owing to the resistances, to be overcome by the pump, which affect its stroke and thus the volume delivered by each single pump stroke. Specifically if the backpressure to be overcome by the pump varies, the flow rate thereof does also vary, and decreases when the backpressure increases. The main related drawback is that, the pump stroke number being the same, different liquid volumes are delivered depending on the backpressure to be overcome and thus not only the liquid volume delivered by the given pump stroke number can vary depending on the application, but it can also vary for the same application if the pump must inject a liquid in a pressurized vessel overcoming an increasing backpressure or anyhow variable resistances due to variable flow rate adjustments must be overcome, so that even for the same application the simple counting of the current pulses applied to an electromagnet cannot any longer reliable.

As above mentioned the pump stroke variation as caused from the resistances to be overcome, originates from the fact that the vibrating pump comprises a piston which is moved by a movable core electromagnet for withdrawing the core when the electromagnet is energized by a current, providing a suction stroke of the piston, and releasing it under the action of a spring loaded during the withdrawing motion, when the current through the electromagnet is switched off; if the pumps are supplied with current pulses having fixed a repetition frequency, it may occur that, in case rather high resistances must be overcome, as for backpressure increases, the compression stroke of the pump is not ended before the arrival of next current pulse and, as a suction stroke begins before the end of the preceeding compression stroke, the length of the latter compression stroke is reduced and the volume delivered by the same number of pump strokes is correspondingly reduced.

In order to obviate such a serious problem, it has been suggested to feed the pump with current pulses having a variable frequency, the beginning of which is controlled by a specific position of the piston within the cylinder so that a suction stroke always begins when the preceeding compression stroke is completely ended, thus ensuring a compression stroke having constant length and thus a constant flow rate of said pump so that an equal pump stroke number corresponds to an equal volume of delivered liquid.

A pump according to the above mentioned feature is described in the Italian utility model application No. 21796 B/84 having the same inventor as the present application and filed on May 15, 1984. In the application there is described a vibrating pump provided with a piston position detector for detecting the piston position which is energized by the piston taking a determined position within the pump cylinder or body, allowing the application of a current pulse to the pump electromagnet only when the piston reaches the position, the piston position detector controlling a driving circuit for the electromagnet and sending also a pulse signal to a digital counter whose counting is increased by one unit every time the piston reaches the position in the pump casing. The counter emits a stopping pulse to the driving circuit, which had been started by a starting control, when a desired counting corresponding to the volume to be delivered by the pump is reached.

The pump of the above mentioned utility model application is rather satisfactory as a metering pump in variable flow rate condition, leading to rather precise metering, specifically in the automatic field of the beverage automatic distributing machines and particularly in the field of the coffee preparing machines. However, it has the main drawback of allowing just one desired metered liquid volume to be delivered, unless a plurality of counters is adopted emitting a stopping signal for the electromagnet at the end of different countings corresponding to different metered volumes.

SUMMARY OF THE INVENTION

The present invention remedies the above mentioned drawback by using a vibrating or electromagnetic pump comprising a piston actuated by a movable core which is moved by an electromagnet, a position detector for the piston, an enabling gate, between the piston position detector and a power amplifier driving the electromagnet, a device characterized by a memory circuit set by an energizing start control signal through the enabling gate, a counter counting pulses coming from the piston position detector and a numerical comparator circuit by which numbers in digital format, coming from the counter, are compared with numbers coming from a digital combinator or numerator, providing a number corresponding to desired meterings, the numerical comparator circuit emitting a reset signal for the memory circuit in order to stop the energization of the electromagnet when the number appearing at the output of the counter coincides with the number appearing at the output of the digital combinator or numerator, the above memory further comprising a supplementary deenergization input to stop at will the energization for the electromagnet.

In a preferred embodiment, the digital combinator or numerator device is keyboard device similar to the devices used for digital remote controls or phone numerical dialling combinators.

According to a further embodiment of present invention in the vibrating pump having the memory set by a selected one of a plurality of electromagnet energization starting controls, there is used a plurality of numerical comparator devices each receiving:

(a) in common the output of the digital counter, (b) the output of the digital numerating device, comprising a first digital address signal for one of the numerical comparator devices and a second digital signal corresponding to desired metering volumes;

(c) an actuating signal associated with one of the controls for the setting of the memory and for the energization start of the electromagnet, (d) a deenergization signal associated with the memory resetting, anyone of the numerical comparators emitting a resetting signal for said memory circuit in order to stop the electromagnet energization, when the number appearing at the counter output coincides with the number at the output of the digital combinator or numerator device, coupled to the numerical comparator actuated by said preselected energization starting control and further comprising a further resetting input for the memory to arbitrarily disable the enabling gate in order to stop at will the energization of the electromagnet.

In a particularly preferred embodiment of the present invention, a position detector of the piston is used having an hysteresis cycle broad enough to allow a safe and precise commutation between a high logical state and a low logical state of the position detector at certain piston positions.

In a further and more preferred embodiment of the present invention the piston position detector is a Hall effect magnetic detector.

In a further preferred embodiment of the present invention the power amplifier for the energization of the electromagnet, driven by a.c. network voltage, comprises a silicon controlled rectifier (SCR), the enabling gate receiving besides to the signal coming from the piston position detector, a zero crossing signal of the a.c. network voltage and a proper enabling signal coming from a circuit receiving a piston signal, a plurality of electromagnet energization starting signals, at the desired metered liquid volume and a possible signal for arbitrarily stopping the energization of said electromagnet.

In a particularly preferred and simplified embodiment, the memory controlling the starting and the stopping of the electromagnet energization has just one setting input, obtained by joining together through a logical gate, such as an OR gate, the setting inputs of the different meterings and the set input for arbitrary metering and two resetting inputs one connected with the different meterings and another connected to the arbitrary metering.

Specifically, the resetting input of the different meterings comprises an assembly of as many step function generators as many as there are the desired meterings and a voltage comparator circuit comparing the voltage of the step function with one or more reference voltages, the voltage comparator emitting a resetting signal for the memory when the step function is equal to one of the reference voltages, the assembly operating as a counter and indicator of a desired piston stroke number.

More preferably, the resetting input of the different meterings comprises an assembly of as many step function generators as many as they are the desired metering, each of the step function generators providing steps of different heights, and a voltage comparator circuit comparing the voltage of the step signal with a preset reference voltage, the comparator emitting a resetting signal for the memory when the step function equals the reference voltage.

Still more preferably, the step function generators comprise a generator of pulses having strictly equal length derived from the pump piston position detector, charging a capacitor through one of a plurality of resistors connectable through commuting means so that, by changing the time constant of a circuit provided by the capacitor and one of the resistors, the time constant being anyhow much longer than the pulse length, the heigth of the single voltage steps is varied, leading to the reference voltage with a higher pulse number for lower step heights and with a lower pulse number for higher step heights thereby countings of desired pulse numbers are carried out.

Alternately, the reset input of the different metered volumes comprises only one step function generator having steps of desired and fixed height and a voltage comparator circuit comparing the step function with one of as many reference voltages as are the metered volumes, to be predetermined the voltage comparator emitting a reset signal for the memory when the step function equals one of the voltage references.

Also more preferably the step function generator comprises a generator of pulses, having strictly equal length charging a capacitor through a resistor, which with the capacitor provides a time constant much longer than the length of the pulses whereby each pulse provides a voltage step, having a fixed and consistent level, and, depending on the reference voltage selected by commutating means, the number of pulses necessary to reach the reference voltage is varied.

Still according to the particularly preferred and simplified embodiment, the use of the setting input for arbitrary metering causes the generation of the step function to be stopped so that the resetting can take place only through the resetting input of the arbitrary metering. According to a first embodiment, the stopping of the generation of the stop signal is obtained by deactivating all the commutating means connecting the plurality of resistors with the capacitor in order to prevent the coupling of the equal length pulses to charge the capacitor. According to an alternative embodiment, the stopping of the generation of the step function is obtained by firstly short circuiting the capacitor, so that it cannot be charged by the equal length pulses and by deenergizing all the commutating means by which the reference voltage is selected, whereby the voltage comparator is subjected to a reference voltage which cannot be attained to avoid that the voltage comparator causes the memory to be reset.

In another preferred embodiment the commutating means for the step function generator are controlled by memory means settable by separated inputs, the number of which is equal to the number of desired metered volumes and resettable at the end of each metering when the memory for actuating an electromagnet energization is reset.

In the embodiment, according to a first alternative, the memory means control commutating means selectively connects a plurality of resistors with a capacitor to provide a step function generator having steps of adjustable height.

In or second embodiment, according to a further alternative, the memory means control commutating means selectively connects a plurality of reference voltages with the voltage comparator.

In a further preferred embodiment in order to reduce the number of connecting controls both to the memory controlling the starting and the stopping of the electromagnet energization and to the memories controlling the commutating means of the simplified counter containing a step function generator, there is used a voltage divider consisting of four resistors, serially connected between a D.C. supply voltage and the ground, the two external resistors of the series having substantially double resistance than that of the two internal resistors, the junction between the first and the second resistors being connected to a first input and the junction between the third and fourth resistors being connected to a second input and the junction between the second and the third resistor or central junction of the voltage divider being connected to a control terminal switcheable between the D.C. supply voltage and the ground voltage in order to yield respectively high and low logical states for the first and second imputs.

According to a further preferred embodiment, the pump drive of the electromagnet, provided by a silicon controlled rectifier (SCR) uses an enabling gate connected through an optical coupling to the Hall effect pump position detector and a zero crossing detector for the zero point of the network voltage applied to the electromagnet in order to synchronize the pump movement with the network voltage.

Alternatively, the present invention can also be embodied by using a microprocessor controller providing the function of setting and counting the liquid volume meterings which must be delivered by the pump, the microprocessor comprising at least an input/output (I/O) port, a read only memory (ROM), a random access memory (RAM), an address bus, a data transfer bus, a central processing unit (CPU), a possibly quartz stabilized clock and imput and output connections from and to the periferical units. According to the last mentioned alternative embodiment, the micro-processor controller operates by sending through the input connections of the I/O port to the central processing unit (CPU) the directions concerning a liquid volume metering to be delivered by the pump, the central processing unit attending on the basis of the information received from the I/O port, to extract from the ROM the information concerning the preselected meterings, the information being possibly presented to the RAM in order to extract therefrom numerical data to be presented to the central unit, so that at the end of the phase for determining the stroke number, the central unit sends to the I/O port directions to enable a gate driving a pump electromagnet according to the invention.

Still according to this last embodiment, the energization of the electromagnet controls the position of a pump piston detected by a detector which in turn controls the electro-magnet energization, producing oscillations by which a liquid pumping is allowed so that, once the oscillations are set pulses arrive to the I/O port corresponding to the oscillations, which pulses are counted by the central processing unit and their total number is compared with the number, stored in the RAM, corresponding to the desired metered liquid volume, so that, when the number of total pulses counted in the CPU coincides with the number stored in the RAM, the central unit emits a stopping direction to the I/O port by which the electromagnet energization and thus the pumping is stopped possibly signalling through displaying devices that a desired liquid metered volume has been delivered.

BRIEF DESCRIPTION OF THE DRAWINGS

The features and the advantages of the present invention will be more apparent from the following detailed disclosure given in an exemplifying and not limiting way, of a practical embodiment thereof with reference to the accompanying drawings wherein.

DETAILED DESCRIPTION OF THE PREFERRED EMBODIMENTS

Figure 1:
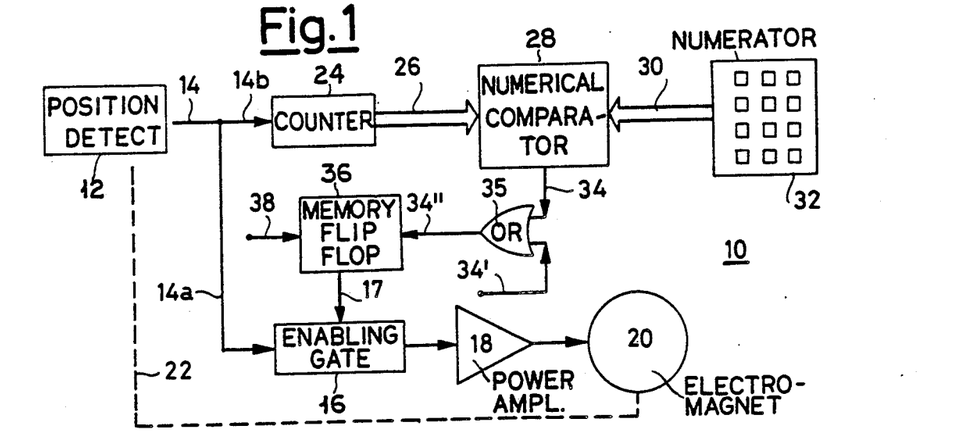
FIG. 1 is a block diagram of a first embodiment of an operating system for metering pump, using a numerical data setting device, as a keyboard, to set, time by time, liquid volumes to be metered by the pump.

Referring to FIG. 1, a first driving system 10 for a metering pump, of the kind having a piston, comprises a piston position detector or sensor 12 emitting an active or high signal when the piston of the pump is close to the detector 12 and a low signal when the piston is far away from the detector (it is possible to devise a detector emitting reverse signals with respect to those of detector 12). The signals provided by the detector 12 are coupled through a line 14, which is divided into a first branch 14a and a second branch 14b, to an enabling gate 16 allowing or preventing the forwarding of the detector 12 signals according to a control signal received from a line 17 whose function will be discussed later on. The gate 16 has an output connected to a power amplifier 18 supplying energy to an electromagnet 20, forming the motor of the vibrating pump by which through mechanical means 22 the position of a movable core of the electro-magnet is transmitted to the position detector 12. The just disclosed assembly of position detector 12, of enabling gate 16, of power amplifier 18 and electromagnet 20 with the mechanical means 22 provides an amplified closed loop driver which through a proper and obvious signal sign selection can be a self oscillating assembly to assure an alternating current component through the electromagnet 20 and thus the movable core movement within said electromagnet.

As it was already stated, the metering pump according to present invention is based on the fact that the piston stroke of the pump is always the same, so that the liquid volume supplied by the pump is proportional to the number of strokes carried out by the piston and thus for setting a desired liquid volume it is sufficient to set the corresponding number of piston strokes, the number being counted by one of the many electronic counter means available from the present integrated circuit art, such as, for example, the counter 24 of the FIG. 1 being discussed. The counting number cumulated in the counter 24 is forwarded through a bus 26 to a numerical comparator circuit 28, comparing the numbers coming from the counter 24 with numbers coming, through a second bus 30, from a numerator or combinator 32 provided, for example, with a keyboard allowing the keyboarding of the desired numbers.

When the number on the bus 26, coming from the counter 24 coincides with the number on the bus 30 coming from the numerator 32, the numerical comparator circuit 28 emits on a line 34 a disabling or reset signal forwarded through an OR gate 35 to a reset input 34″ of a memory circuit 36 such as a flip-flop, whose output 17 is used to enable or disable the gate 16, allowing or preventing a signal forwarding from the piston position detector 12 to the power amplifier 18. The memory flip-flop circuit 36 has further a starting or set input 38 for receiving a signal allowing the starting of the pump operation, as well as a disabling or reset supplementar input 34′ for stopping the pump at will. The operation of the metering pump driving system 10 is the following.

Through the keyboard of the numerator or combinator 32 the liquid volume to be supplied by the pump is predetermined, for example by typing a number on the keyboard, and then, through a pushbottom contact connected to the input 38, a starting or set signal is coupled to the memory 36, such as an enabling signal transmitted through the line 17 to the gate 16. Once the gate 16 is enabled, the signals coming from the detector 12 control the power amplifier 18 driving a current within the electromagnet 20, which, owing to the displacement of the movable core, varies the detector 12 output, causing the oscillation of the driving circuit of the electromagnet 20 and thus the movement of the pump beginning the liquid delivery. At this time, a pulse train is emitted from the detector 12, and the pulse train from detector 12 is counted by the counter 24 on the output of which numbers appear equal to the received pulse number. These numbers are forwarded to the numerical comparator 28 which can be one of many logic units capable of carrying out this kind of operation, which does not emit any signal when the numbers on its input buses 26 and 30, respectively, are different and emits a signal when the numbers are equal. The signal emitted by the numerical comparator 28 is forwarded through the line 34 and the OR gate 35 to reset the memory 36, which nullifies the enabling signal on the line 17, interrupting the signal forwarding through the gate 16 and then stopping the energization of the electromagnet 20 and the motion of the pump actuated therefrom. The pump which began to operate owing to a starting command on the start or set input 38, stops after a stroke number has been completed as preset by the numerator 32 thus determining the desired liquid volume to be delivered.

Obviously with the driving system of FIG. 1, it is necessary to set time by time the liquid volume or the corresponding stroke number of the pump, possibly stored in a memory or latch till it is changed by means of the numerator or keyboard combinator 32.

Figure 2:
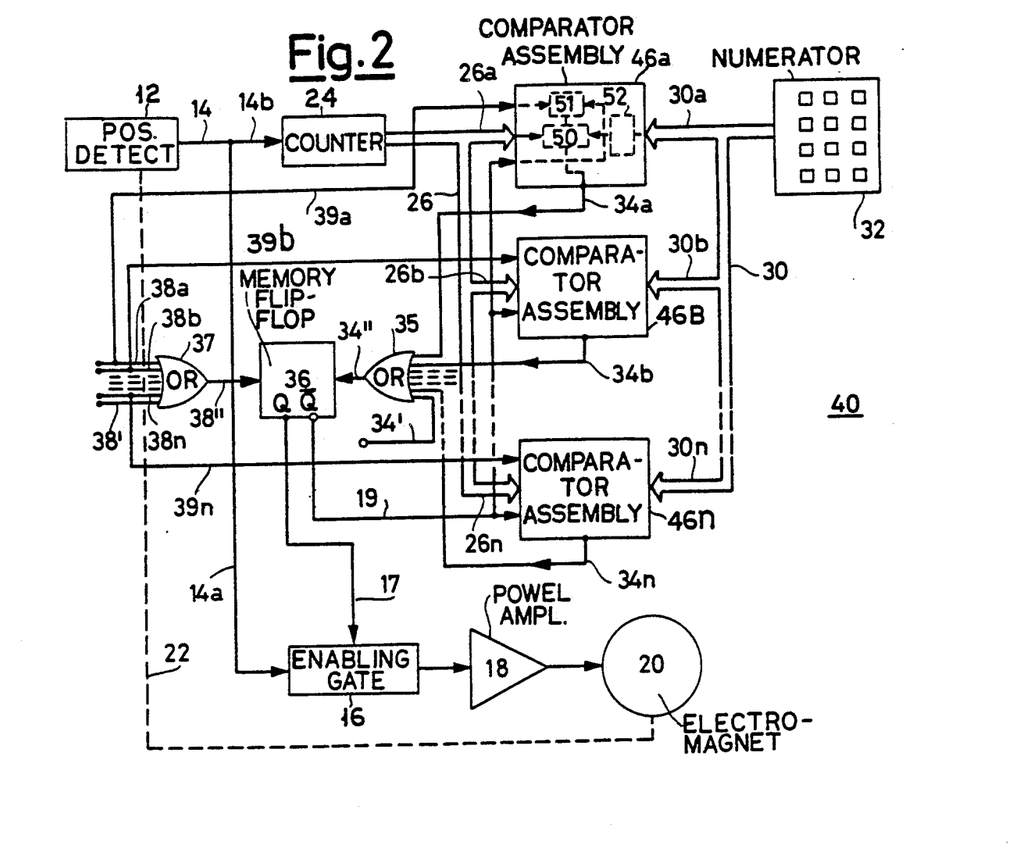
FIG. 2 is a block diagramm of a second embodiment of a metering pump operating system using a numerical data setting device to preset a plurality of selectable liquid volumes, to be metered by said pump, which can be selected at will.

A more practical system 40, depicted in FIG. 2 wherein parts similar to those depicted in FIG. 1 are indicated by the same reference numerals, allows to provide and select through simple criteria, such as the actuation of a plurality of push-buttons or the sending of a signal to one of a plurality of input connectors 38a, 38b, ... 38n, and input connector 38' controlling the start or set of a flip-flop memory circuit 36 through a multiple input OR gate 37, having an output connected to the setting input 38" of said flip-flop 36, one among many possible metered amounts previously preset by the numerator or keyboard combinator 32. In this case the output bus 30 of the keyboard combinator 32 is divided into a number of input branches 30a, 30b, ... 30n for corresponding numerical comparator assemblies 46a, 46b, ... 46n, having another input 26a, 26b, ... 26n, connected to the output 26 of a pulse counter 24 and their respective output lines 34a, 34b, ... 34n, combined in the OR gate 35 at the reset input 34" of the flip-flop 36 and further each having an actuation or enabling input 39a, 39b, ... , 39n connected to the connectors 38a, 38b, ... 38n respectively and a common disabling input connected to an inverted output line 19 of the flip-flop 36, said flip-flop 36 having a direct or true output 17, which likewise to what happens in FIG. 1, actuates the enabling gate 16. Specifically, each numerical comparator assembly 46a, 46b. .. 46n, can be meant as provided by a numerical comparator 50, a flip-flop memory 51 and an addressable latch 52, by which a number coming from the numerator or combinator 32 through one of the bus branches 30a, 30b, ... 30n is maintained on record, when an address signal coming from said combinator 32 enables the corresponding latch 52.

However, it is to be pointed out that if the metering requirements were invariable, i.e. if a certain number of invariable metered volumes would had to be selected, the numerator or combinator 32 and the connecting buses 30a, 30b, ... 30n connected with input bus 30 might be eliminated, each latch 52 being replaced with a proper logical circuit, capable of expressing the desired number or with a read only memory (ROM) capable containing the number to be compared with the number emitted by the counter 24 to provide on the respective output lines 34a, 34b, ... 34n the reset signals to be forwarded through the OR gate 35 to the flip-flop memory circuit 36.

The operation of the circuit depicted in FIG. 2 is as follows: once the numerical data to be introduced in the latch 52 of the numerical comparator assemblies 46a, 46b, ... 46n through the connecting buses 30a, 30b, ... . 30n have been determined by numerator or key board combinator 32, it is sufficient to forward a starting signal to one of the start control inputs 38a, 38b, ... 38n, 38', of the OR gate 37 on the set input 38" of the flip-flop memory 36 to actuate the gate 16 allowing the signal forwarding from the position detector 12 to the power amplifier 18, then to the electromagnet 20, finally closing the circuit loop through the mechanical connecting means 22 and allowing the starting of an oscillatory movement of the pump piston. Once the movement of the pump piston starts, the counter 24 begins to count the strokes of the piston, presenting the total number of the strokes to the numerical comparator assemblies 46a, 46b, ... 46n. Everytime the counter 24 reaches a number recorded in one of the latches 52 of one of said numerical comparator assemblies, whose input 39a, 39b, ... 39n has been actuated by the corresponding connection 38a, 38b, ... , 38n, the assembly emits a reset signal onto the corresponding output 34, 34b, ... , 34n, which through the OR gate 35, does reset the memory circuit 36.

The resetting of the memory circuit 36 emits on its inverted output a signal which, through the inverted or complementary output line 19, deactuates the previously actuated numerical comparator assembly, and resets on the output 17 the actuating or enabling signal for the gate 16, stopping the operation of the metering pump.

Figures 3, 4:
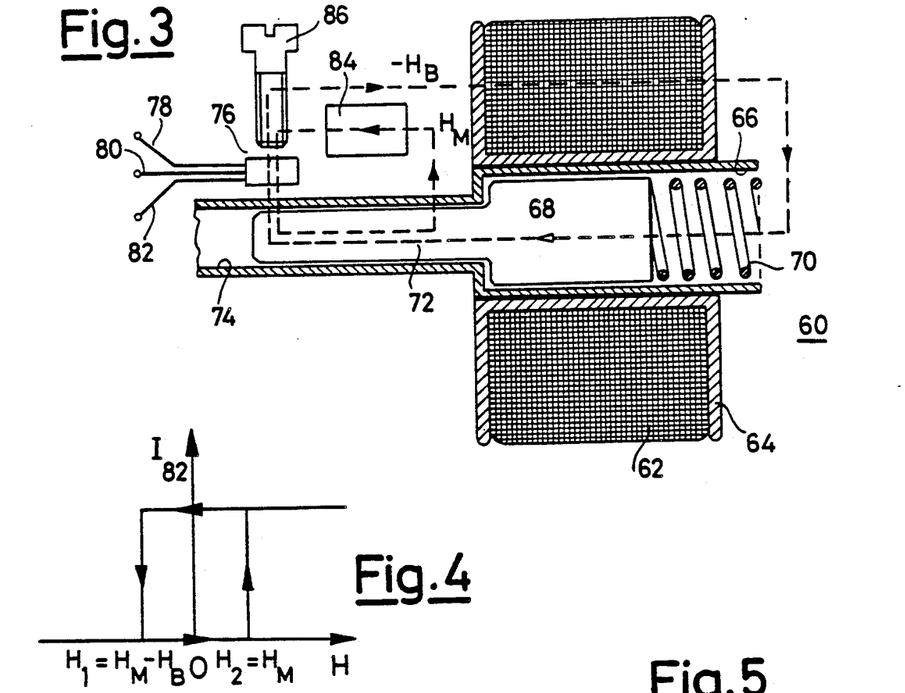
FIG. 3 is a schematic picture of a vibrating pump provided with a pump stroke detecting device which is a Hall effect magnetic field detector connectable to the pump casing.
FIG. 4 is a graphical diagram depicting a hysteresis cycle of a typical magnetic field detector applied to a pump of the kind illustrated in FIG. 3.

For a better understanding of the present invention, it is necessary to consider in more detail a vibrating pump having associated a piston position or pump stroke detector, as depicted in FIG. 3. Said vibrating pump provided with a piston position detector is the subject of the Italian utility Model Patent Application No. 21,796 B/84 filed on May 15, 1984, and having as inventor the same inventor of the present invention.

According to FIG. 3, a vibrating pump 60 comprises an electromagnet coil 62 wound on a reel 64 surrounding a tubular seal tight chamber 66 wherein a movable core 68 is displaceable and is maintained in the position shown in the figure by a spring 70. The movable core 68 is extended in a pump piston 72 movable within a pump housing 74, having the shape of a cylinder narrower than the tubular chamber 66. Said piston 72 in the pump housing 74 has a like behaviour as the piston of a syringe, displacing for each stroke a liquid volume substantially equal to the volume of the stroke, so that the total liquid volume displaced by the pump results, as already stated, proportional to the stroke number thereof and thus to the vibration cycle number of the movable core 68.

The only thing which must be done for evaluating the metered volume of liquid displaced by the vibrating pump is to count the vibration cycle number of the core 68, having the care of obtaining a signal pulse for everyone of said cycles. For obtaining said pulse it is necessary to have a piston position detector emitting a signal every time the pump piston 72 is in the same position, for example in its maximal extension position, when, failing any current through the coil 62 of the electromagnet (in a deenergized condition of coil 62), the spring 70 pushes the movable core 68 and thus the pump piston 72 into the position.

One among the most proper position detectors for the piston 72 is a Hall effect magnetic detector 76 provided with feeding terminals 78 and 80 and with at least an output terminal 82. The Hall effect magnetic detector is assisted in the operation by a permanent magnet 84 and by a calibrating screw 86 having the hereinbelow discussed functions. The permanent magnet 84 produces a first field $H_M$ having a given direction, the coil 62 crossed by a variable but unidirectional current produces a second field having strenght $-H_B$ in opposite direction with respect to that of the permanent magnet 84. When the coil 62 is crossed by current, the Hall effect magnetic detector 76 is submitted to a magnetic field strength $H_1 = H_M - H_B$ producing a low current absorption on its output terminal 82, while when the current through the coil ceases the magnetic detector 76 is submitted to the field strength $H_2 = H_M$ which produces a high current absorption on its output terminal 82. This fact is specifically depicted in FIG. 4 showing the level of the current $I_{82}$ absorbed at the terminal 82 of the magnetic detector 76 versus the field strength to which the detector is submitted. It is to be noted that the transfer from low to high current takes place substantially at the strength $H_2 = H_M$, while the reverse transfer takes place the strength $H_1 = H_M - H_B$ quite different and is less than $H_2$, determining a hysteresis cycle supporting the most neat and the quickest possible status changes, which makes the detector of the present invention specifically suited to control digital circuits.

Obviously it is not necessary that, as depicted in FIG. 4, $H_1$, and $H_2$ are symmetrical with respect to the origin of the axes as they could be both at the right or at the left of said origin.

The calibrating screw 86 is essential in getting a magnetic gap which, the current in the coil 62 and with the same permanent magnet 84, does set the best status change points at the detector 76.

Figure 5:
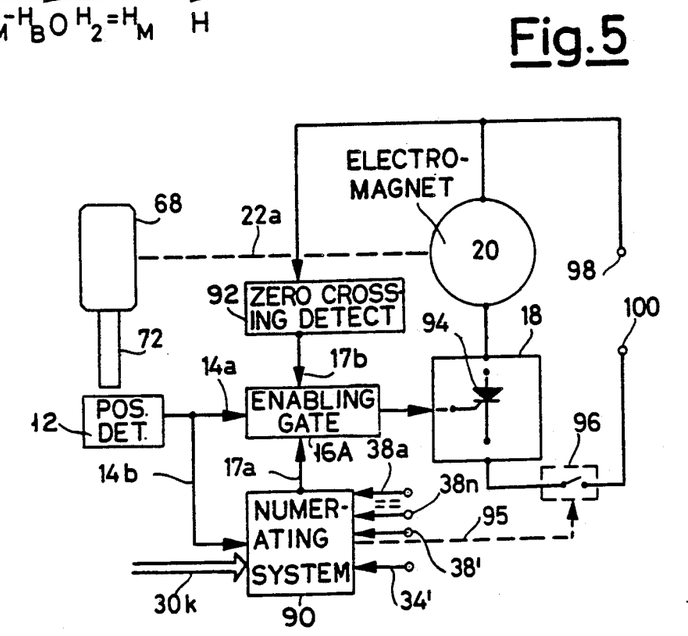
FIG. 5 is a block diagram of an electromagnet driving system for a vibrating pump, of the kind depicted in FIG. 1, using for the control, a circuit comprising a silicon controlled rectifier (SCR)

An embodiment of the invention, as substantially suggested by the block diagram of FIG. 1, is depicted in more detail in FIG. 5.

According to such an embodiment comprised with an electromagnet 20 directly supplied by the a.c. netword voltage, there is always a piston position detector 12 controlling through an enabling gate 16a a power amplifier 18 operating with a.c. supply, the enabling gate 16a receiving a driving signal from the position detector 12 through a line 14a, a first enabling or actuation signal from a starting, stopping and numerating system 90 through a first line 17a, and a synchronizing signal with the a.c. electric network from a zero crossing detector 92 through a second line 17b. The enabled and synchronized signal coming out from the enabling gate 16a, comes in as a driving signal to the amplifier 18 which, in the present case supplies the electromagnet 20 from the network voltage, and is a circuit containing at least a silicon controlled rectifier (SCR) 94 allowing the electromagnet 20 to be crossed by a unidirectional current controlled by the position detector 12 through the enabling gate 16a. Said SCR amplifier is advantageous for driving the electromagnet 20 because it permits a direct supply thereof by the electrical network and interrupts by itself at any network halfwave inversely biasing the SCR. The starting, stopping and numerating system 90 may contain for example the components 24, 28 and 36 of FIG. 1 which control the pump starting allowing a first current pulse through the electromagnet 20 when a start signal arrives to one of the terminals 38a, 38b ... 38n, 38' and then allowing the transit of driving pulses from the piston position detector 12 to the power amplifier 18 to permit the pump piston oscillation, then counting the detector 12 pulses until they are equal in number to a preset number on a bus 30k, at what time the disables enabling gate 16a, or disabling the gate 16a owing to a stop signal received on one of the terminals 38a, 38b, ... 38n, 38'. In an alternate form of this specifical embodiment the enabling signal instead of reaching the gate 16a through the line 17a, might consist of an actuating signal 95 for an auxiliary contact pair 96 on one of the network terminals 98 and 100 connecting the electromagnet 20 and power amplifier 18 to the supply network.

Figure 6:
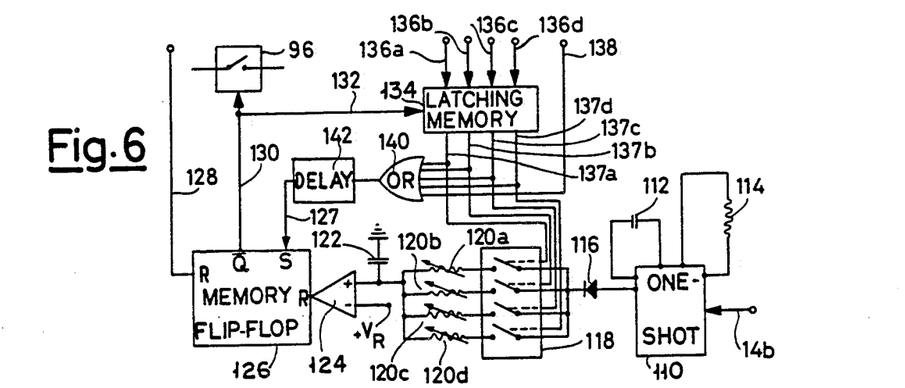
FIG. 6 is a block diagram of a first simplified embodiment of a pulse counter and numerical comparator circuit to be used in the metering control system of present invention.

Reference is made to FIG. 6 depicting a first embodiment of a pulse counter and numerical comparator circuit useful to control metered liquid volumes to be supplied by the pump, starting the pump and stopping it upon a stroke number preset by a delay circuit contained in the present pulse counter is carried out.

The pulse counting circuit essentially comprises a first monostable one-shot circuit 110, receiving on a terminal 14b the pulses coming from a piston position detector 12 (shown in FIGS. 1, 2 and 5) and provided with a capacitor 112 and a resistor 114 to produce pulses, having equal time length, emitted by the monostable circuit 110. Such pulses pass through a diode 116, switching means 118 and one of a plurality of variable resistors 120a, 120b, 120c and 120d to charge a capacitor 122 raising the voltage thereon. The capacitor is also connected to a non inverting input of a voltage comparator 124 whose inverting input is connected to a reference voltage $+V_R$. The output of the voltage comparator is connected to resetting or deactuating input of a memory flip-flop or a bistable circuit 126 receiving a setting or actuating signal at another input 127 and a further resetting or deactuating signal at another input 128. The bistable circuit 126 emits on a line 130 a signal having two purposes: one purpose is actuating the auxiliary contact pair 96 (enabling the pump operation) and the other purpose is forwarding through a further line 132 a blocking signal for the input state of a latching memory circuit 134.

The latching memory circuit 134 is a circuit receiving actuating signals from input terminals 136a, 136b, 136c and 136d emitting them from output terminal 137a, 137b and 137d to actuate both one of the gates of the switching means 118 and an input of an OR gate 140 whose output through a delay circuit 142 is coupled to the setting or actuating input 127 of the bistable circuit 126.

Figure 7:
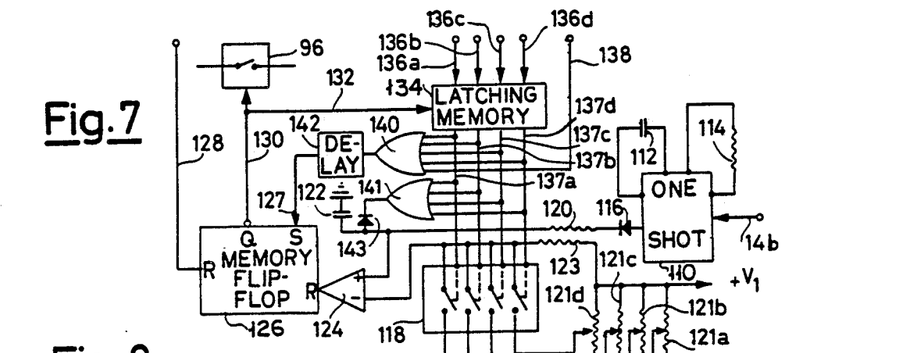
FIG. 7 is a block diagram of a second and alternative simplified embodiment of a pulse counter and numerical comparator circuit to be used in the metering control system of present invention instead of FIG. 6 circuit.

The embodiment example depicted in FIG. 6 is an obvious alternative of the FIG. 6 embodiment, differing from that just for the fact that to determine the number of pulses, coming from the monostable circuit 110, corresponding to a desired liquid volume to be displaced, instead of using voltage increments, at the non-inverting input of the voltage comparator 124, having a variable amplitude according to the time constant RC determined by one of the variable resistors 120a–120d and by the capacitor 122, obtaining a state change of the bistable circuit 126 when the voltage on the non-inverting input is equal to the voltage on the inverting input, is used a constant voltage increment depending by the time constant RC determined by a fixed resistor 120 and by the capacitor 122 and different reference voltages are used by connecting the inverting input of the voltage comparator 124 through the switching means 118, to movable wipers of a plurality of potentiometers 121a, 121b, 121c, and 121d, determining as many reference voltages for said voltage comparator 124.

Figure 8:
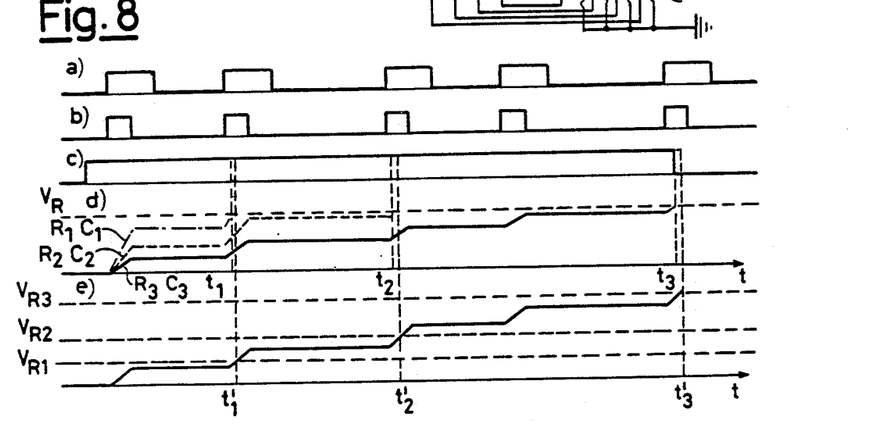
FIG. 8 shows graphical diagrams illustrating the operation of the FIGS. 6 and 7 circuits.

The comparative operation of both embodiments of FIG. 6 and 7 is depicted in the graphical representation shown in FIG. 8. In said graph the diagram (a) shows the pulses coming from the piston position detector 12 appearing on the terminal 14b, the diagram (b) shows how said pulses are processed by the monostable circuit 110 in pulses having constant time length, the diagram (c) shows the signal appearing on the output terminal 130 of the bistable circuit 126, the diagram (d) shows the voltages appearing at the two inputs of the voltage comparator of FIG. 6 and the diagram (e) shows the voltages at the two inputs of the voltage comparator 124 of FIG. 7.

The definite understanding of the operation of both the above mentioned circuits is obtained by considering FIG. 6 with the corresponding graphs in FIG. 8, as well as the FIG. 7 and its corresponding graphs in FIG. 8.

When one of the preset volumes is desired, one of the inputs 136a-136d of the memory 134 is actuated, for example by putting a high voltage level on said input, so that the corresponding output 137-137d becomes high. The high state of one of said outputs goes through the OR gate 140 and the delay circuit 142, having the duty of eliminating transitory noise and incidental or undesired actuations of memory 134 inputs to the setting or actuating input 127 of the bistable circuit 126 whose output on the terminal 130 becomes high, as depicted in the diagram (c) in FIG. 8. The high output on the terminal 130 closes the contact pair 96 allowing the energization of the pump electromagnet 20 (shown in the FIGS. 1, 2 and 5) and the same high output through the connecting line 132, maintains or confirms the state of the memory 134 so that the one of its outputs 137a, 137b, which was actuated, remains actuated independently from the further state taken by the corresponding input 136a-136d. Taking it into account that, as the pump begins to operate, on the terminal 14b appear the pulses shown in the diagram (a) of FIG. 8 and thus at the output of the monostable circuit 110 appear the pulses shown in the diagram (b) of FIG. 8. Since the output of the first monostable one-shot circuit is connected to the one of the variable resistors 120a-120d corresponding to the one high of the outputs 137a-137d, the capacitor 122 is charged, according to a time constant RC determined by its capacity and by the resistance of the connected resistor among the variable resistors 120a-120d, during the time in which the pulses of the diagram (b) are high, receiving for each charge a voltage increment whose amplitude is substantially inversely proportional to the length of the time constant RC (it happens everytime the time constant RC is much longer than the length of the pulses by coming out from the monostable circuit 110), so that the voltage on said capacitor 122 increases for each pulse b as depicted in the diagram (d) of FIG. 8, charging from 0 to $V_R$ and, if each voltage increment is one $n^{-th}$ of the voltage $V_R$, n pulses, corresponding to n pump strokes, are necessary in order to reach on the capacitor 122 the voltage level $+V_R$ present on the inverting input of the voltage comparator 124. When the voltage on the capacitor 122 reaches said level $+V_R$, the voltage comparator 124 resets the bistable circuit 126 lowering its output on the terminal 130 which opens the contact 96, stopping the pump and, at the same time relieves or resets the state of the memory 134, making its outputs equal to the inputs. It is to be noted from the diagram (d) of FIG. 8 that the pump stroke number depends on the time constant RC determined by the capacitor 122 and by one the variable resistors 120a-120d, it being understood that for a shorter time constant $R_1C_1$ the voltage $+V_{RS}$ is reached at the time $t_1$ corresponding to two pump strokes, for a longer time constant $R_2C_2$ the voltage $+V_R$ is reached at a time $t_2$ corresponding to three pump strokes and for a third still longer time constant $R_3C_3$ the voltage $+V_R$ is reached after five pump strokes. Obviously these pump stroke numbers are given just for a simple indication it being meant that, as matter of fact, said pump stroke numbers are always much higher (of the order of tenths or hundreds).

Likewise for the FIG. 7 embodiment, taking it into consideration the diagrams (a), (b), (c), (e) of FIG. 8, when one of the preset volumes is desired, one of the inputs 136a-137d of the memory 134 is actuated or set for example applying a high voltage level on said input, so that the corresponding output becomes high. The high state of one of said outputs goes through the OR gate 140 and the delay circuit 142, having the duty of eliminating transitory noise and incidental or unwanted actuations of the memory 134 inputs at the setting or actuating terminal 127 of the bistable circuit 126 whose output on the terminal 130 becomes high, as depicted in diagram (c) in FIG. 8. The high output of the terminal 130 closes the contact pair 96, allowing the energization of the pump electromagnet 20, (shown in FIGS. 1, 2 and 5) and the same high output through the connecting line 132, maintains or confirms the state of the memory 134, so that the one of its outputs 137a-137d which was actuated, remains in such a condition independently from the further state taken by the corresponding input 136a-136d, just exactly as it takes place in the FIG. 6 embodiment. Likewise to what takes place in the FIG. 6 embodiment, as the pump operation is started at the terminal 14b of FIG. 7 and then at the output of the monostable circuit 110, the pulses depicted in the diagram (b) of FIG. 8 appear.

Since the output from the first monostable one-shot circuit is connected through the diode 116 and the resistor 120 to the capacitor 122, the latter will be charged, according to a time constant RC determined by the resistance of the resistor 120 and by the capacity of the capacitor 122 undergoing for each pulse (b) a voltage increment which is substantially inversely proportional to the length of said time constant RC. The voltage on said capacitor 122 and thus on the non-inverting input of a voltage comparator 124, increasing by a fixed increment for each pulse (b) until it becomes equal to a voltage applied to the inverting input of the same comparator 124 and obtained by connecting through switching means 118 said inverting input to one of a potentiometer plurality 121a-121d each setting a reference voltage $V_{R1}, V_{R2} \ldots$ for said comparator 124.

As clearly visible in the diagrams (c) and (e) of FIG. 8, according to the preselected reference voltage, the output 130 of the bistable circuit 126 will remain high for a longer or shorter time. In fact if the reference voltage $V_{R1}$ is set by connecting the inverting input of the comparator 124 to the first potentiometer 121a, the pump will stop at the time $t'_1$ corresponding to two pump strokes; if the reference voltage $V_{R2}$ is set, the pump will stop at the time $t'_2$ corresponding to three pump strokes, and if the reference voltage $V_{R3}$ is set, the pump will stop at the time $t'_3$ corresponding to five pump strokes. Obviously these pump stroke numbers are given just for an indication, since as a matter of fact said pump stroke numbers are always much higher (of the order of tenths or hundreds).

It is to be noted that both the circuits of FIGS. 6 and 7, are provided in addition to the inputs 136a–136d for counting preset numbers of pump strokes corresponding to preset liquid metered volumes, also with an independent terminal 138 to start a continuous operation of the pump, and with an independent terminal 128 to stop said continuous operation, in order to obtain liquid metered volumes of arbitrary entity. Said, independent inputs operate by activating or setting and deactivating or resetting the bistable circuit 126, respectively.

Let us consider first FIG. 6. When the terminal 138 is actuated, for example by applying to on the same a high voltage level, said level arrives through the OR gate 140 and the delay circuit 142 to the actuating terminal 127 of the bistable circuit 126 which through its output terminal 130, closes the contacts allowing the electromagnet 20 of the pump to be energized (FIGS. 1, 2 and 5). When the bistable circuit has been actuated or set, it remains in that state until a deactuating or reset signal arrives at the terminal 128 because, as none of the terminals 136a–136d of the memory 134 has been actuated, none of the switching gates 118 is conducting and thus no pulse coming from the monostable circuit 110 is able to charge the capacitor 122 for operating the voltage comparator 124 providing the resetting of the bistable circuit 126. Thus if the bistable circuit 126 cannot be reset or deactuated by the comparator 124, it can be reset just by the terminal 128. In conclusion, the terminal 138 starts a continous operation of the pump and the terminal 128 stops it without any intervention of the pump stroke counting circuits.

The circuit shown in FIG. 7 operates in a similar manner, but its whole operation is a little more complicated since, besides preventing the pulses coming the monostable circuit 110 from reaching the voltage comparator 124, at the inverting input thereof such a reference voltage must be assured which can never be exceeded by voltages possibly present at the non-inverting input.

In order to prevent the arrival of the pulses on the non-inverting input of the comparator 124, a circuit is provided containing an OR gate 141 and a diode 143 mantaining a low voltage level on the capacitor 122 when does not exist any actuating signal on at least one of the terminals 136a–136d. To ensure a reference voltage high enough on the inverting input of the voltage comparator 124 a resistor 123 is provided permanently connected between the DC supply voltage circuits and said inverting input. Said resistor is selected with such a high resistance to not substantially affect the voltage levels provided by the potentiometers 121a–121d when one of said potentiometers is connected through one of the switching gates 118 to said inverting input of the voltage comparator 124, although permitting to provide a reference voltage substantially equal to $+V_1$ when no potentiometer is connected. In conclusion, also in the FIG. 7 circuit the terminal 138 starts a continuous operation of the pump and the terminal 128 stops it without any intervention of the pump stroke counting circuits.

Figure 9:
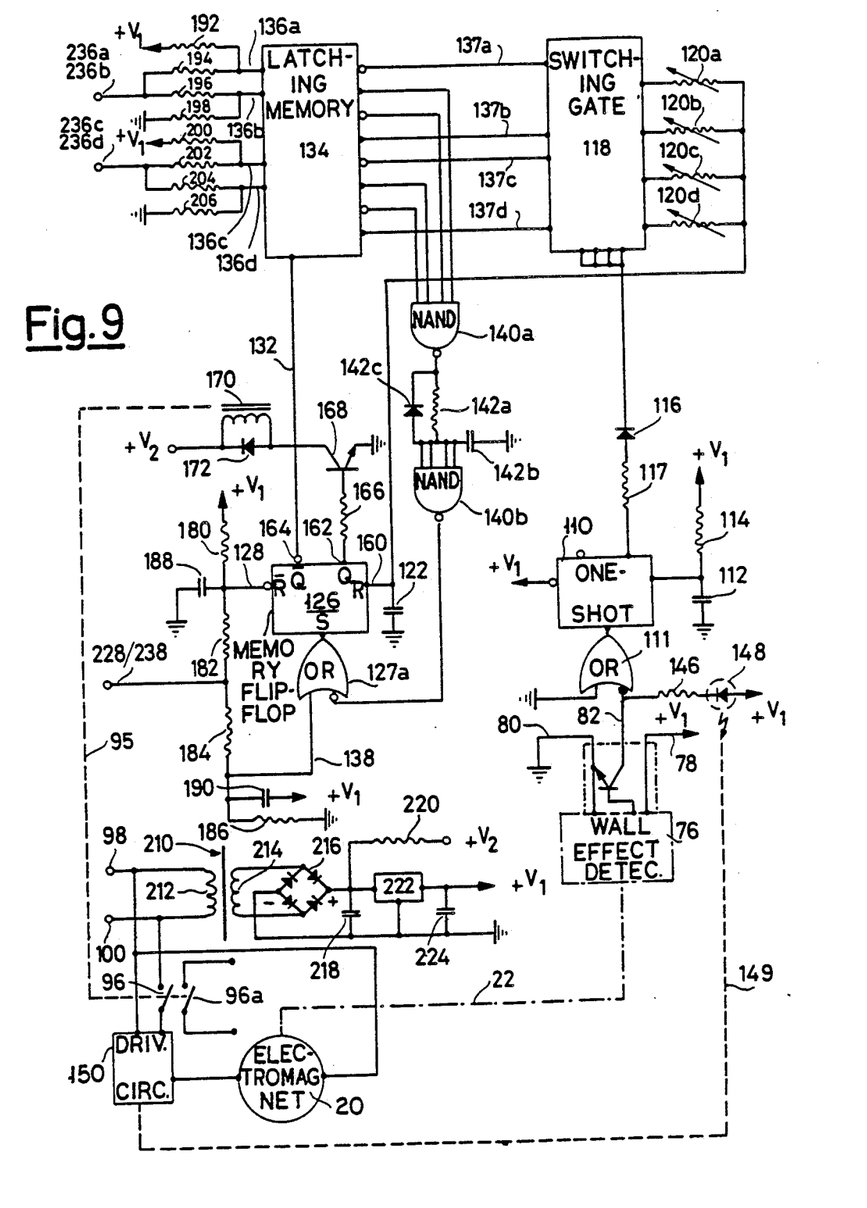
FIG. 9 is a complete circuit diagram of a metering pump control circuit, according to a most preferred embodiment specifically depicting how many pulses are counted and compared to the pulses coming from a pump piston position sensor and how it is started and stopped, any pump actuation determining a liquid metering.

Referring to FIG. 9 which depicts in detail a complete metering pump circuit using the pump stroke counting system of FIG. 6, the position of said pump piston is detected by the Hall effect magnetic detector 76, whose terminals 78 and 80 are connected to the supply voltage $+V_1$ and to ground, and whose output terminal 82, consisting of an unconnected collector of a transistor, is connected from one side to an inverting input of a OR gate 111 and from the other side to a series circuit comprising a resistor 146 and a light emitting diode (LED) 148 connected to the supply voltage $+V_1$. The light emitted by said diode 148 arrives through a proper optical path 149 to a a circuit 150 driving the electromagnet 20 assuring a current crossing through said electromagnet every time the Hall effect detector 76 feels the proximity of the pump piston symbolized by the dashed-dotted line 22. The low state appearing on the output terminal 82 of the detector 76 is changed in a high state at the inverted input of the OR gate 111 and enters the monostable circuit 110, which assures at its output a voltage pulse whose time length depends on the time constant determined by the capacitor 112 and by the resistor 114. Thus, everytime the output 82 of the detector 78 changes from a high to a low state and thus, inversely, the inverted input of the OR gate 111 changes from a low to a high state, at the output of the monostable circuit 110 a high pulse is formed having time length determined by the capacitor 112 and by the resistor 114. Said pulse is forwarded through a protecting resistor 117 and a diode 116 to a switching gate 118 equivalent to four parallelly connected contacts between the cathode of said diode 116 and the variable resistors 120a–120d, said contacts being able to be closed selectively by one of the control terminals 137a–137d coming from the memory assembly 134, which selects what circuit must be closed between the cathode of the diode 116 and one of the variable resistors 120a–120d.

The variable resistors 120a–120d together with capacitor 122 set the time constants $R_1C_1$, $R_2C_2$, $R_3C_3$, $R_4C_4$ with which is charged the capacitor 122 connected to a deactuating or resetting input of the bistable circuit 126, so that the voltage on said input reaches a level high enough for the resetting just after that on the capacitor 122 are accumulated as many voltage increments, corresponding to pulses coming from the monostable circuit 110, as they are set by the time constant determined by the capacitor 122 and by one of the resistors 120a–120d. When said resetting level is reached, the bistable circuit 126 is deactuated through a mechanism herebelow explained in detail. Turning to the particulars it is seen that the bistable circuit 126 has a double setting or actuating input 127a consisting of an OR gate having a direct input and an inverted input, a direct resetting input 160 connected to the capacitor 122, an inverted resetting input 128, a direct output 162 and an inverted or complementary output 164. The direct output 162 is connected through a resistor 166 to the base of a resistor 168 driving a relay 170, provided with a free weeling diode 172 which through a mechanical connection 95 actuates contact pairs 96 and 96a, providing for the enabling of the above mentioned driving circuit 150 of the pump electromagnet 20 and the actuation of signalling or auxiliary devices such as lights, powder meters, etc.. The inverted output 164 is connected through a line 132 to the control memory 134 for blocking or confirming the same, i.e. to retain the states introduced through the inputs 136a-137d. Specifically when the output 164 is high and thus the bistable circuit 126 is reset, the memory 134 is transparent, i.e. its outputs 137a-137, can take the states of the corresponding inputs 136a-136d, while when the output 164 is low and thus the bistable circuit 126 is actuated, the memory is maintained i.e. it retains the states present on the output 137a-137d, independently from the state of the inputs 136a-136d, this specifically helping to avoid that a different metered volume is selected when the pump is operating for the delivering of a preset metered volume.

The non-inverted actuating or setting input 138 on the OR gate 127a and the deactuating or resetting input 128 are connected to a network comprising a series connected resistor assembly 180-186, in turn connected between the DC supply voltage $+V_1$ and ground. Specifically said resistor series connected network comprises two resistors 180 and 186 and two resistors 182 and 184, said resistors 180 and 186 having substantially double resistance with respect to the two resistors 182 and 184, so that on said network operating as a voltage partitioner at the junction of the resistors 180 and 182 there is a voltage of $\frac{2}{3} V_1$, at the junction of the two resistors 182 and 184 there is a voltage of $\frac{1}{2} V_1$ and at the junction between the resistors 184 and 184 a voltage of $\frac{1}{3} V_1$.

This specifical resistor network 180-186 connected between the supply voltage $+V_1$ and ground although not strictly necessary in the present invention, allows just one terminal 228/238 to be used for obtaining the manual setting and resetting of the bistable circuit 126, as it will be explained in more detail herebelow in the FIGS. 10 and 11 for two similar networks of resistors 192-198 and 200-206 connected to the respective inputs 136a-136d of the memory 134.

It is also to be noted a capacitor 188, connected between the input 128 and ground, assures that the bistable circuit 126 is always reset for any energization or turning-on of the apparatus and a capacitor 190 connected between the input 138 and $+V_1$ is provided for eliminating transient noise. To complete the description of the embodiment of FIG. 9 it is seen that said circuit is provided, for the supplying from the a.c. electric network, with a transformer 210 having primary winding 212 connected to the terminals 98 and 100 of the electric network and secondary winding 214 is connected to the input of a bridge rectifier 216 whose output is connected to a first levelling capacitor 218 on which a first higher voltage is formed substantially equal to the voltage $+V_2$ between a resistor 220 and ground, having the duty of supplying the relay 170 driven by the transistor 168. The same output of the rectifier 216 is connected to the input of a stabilizer 222, on the output of which, there is provided with a second levelling capacitor 224, and a lower stabilized voltage $+V_1$ appears supplying all the electronic circuit depicted in said FIG. 9.

To the nework terminals 98 and 100, the driving circuit 150 for the pump electromagnet 20 is also connected, the circuit 150 driving the electromagnet 20 and receiving actuation from the contact pair 96 and a control signal from the optical path 149 with the light emitting diode (LED) 148 driven by the Hall effect magnetic detector 76. Referring to FIGS. 10 and 11, by which two elements 134a and 134b of the memory 134 are taken into consideration, it is seen how operation of one of the two networks of four resistors connected as voltage partitors to supply on just one terminal the signals for two inputs of the memory 134 takes place, and it is understood that said principle equivalentely applies to the four resistor network supplying signals to the inputs 128 and 138 of the bistable circuit 126. Specifically, as already told for the network of resistors 180-186, in FIG. 9 the resistor network 192-198 comprises two external resistors 192 and 198 having a double resistance with respect to two internal resistors 194 and 196 so that, by indicating with $+V_1$ the supply voltage, on the terminal 136a connected to the junction between the resistor 192 and 194 there appears a voltage of $\frac{2}{3} V_1$, the voltage of $\frac{1}{2} V_1$ appears on the intermediate terminal 250 and the voltage of $\frac{1}{3} V_1$ appears on the terminal 136b. Looking at FIG. 11 together with FIG. 10, it is seen what happens when the terminal 250 is connected to ground voltage or to $+V_1$ voltage, by closing the contact pairs 236a or 236b, respectively.

In the first case the voltage on the terminal 250 falls from $\frac{1}{2} V_1$ to zero, while the voltage on the terminal 136a is lowered from $\frac{2}{3} V_1$ to $\frac{1}{3} V_1$ and the voltage on the terminal 136b is lowered from $\frac{1}{3} V_1$ to zero. In the second case the voltage on the terminal 250 is raised from $\frac{1}{2} V_1$ to $+V_1$, while the voltage on the terminal 136a is raised from $\frac{2}{3} V_1$ to $+V_1$ and the voltage on the terminal 136b is raised from $\frac{1}{3} V_1$ to $\frac{2}{3} V_1$. Taking now into consideration that in many integrated circuits usable in the present invention (such as the CMOS circuits) the voltages lower than 45% of the supply voltage are considered low states, and for high states the voltages are higher than 55% of the supply voltage, with an uncertainty region of about 10% of said voltage, as depicted in FIG. 11, it is apparent that the closure of the contact pair 236a brings in a low state (logical 0) both inputs 136a and 136b of the memory members 134a and 134b, while the closure of the contact pair 236b brings in a high state (logical 1) both inputs.

As of the memory member 134a just the inverted output is used, while of the memory member 134b just the direct output is used, it happens that when both memory inputs 136a and 136b are low, the memory output 137a is high and the memory output 137b is low, while vice versa, when both memory inputs 136a and 136b are high, the memory output 137a is low and the memory output 137b is high.

Figures 10, 11, 12:
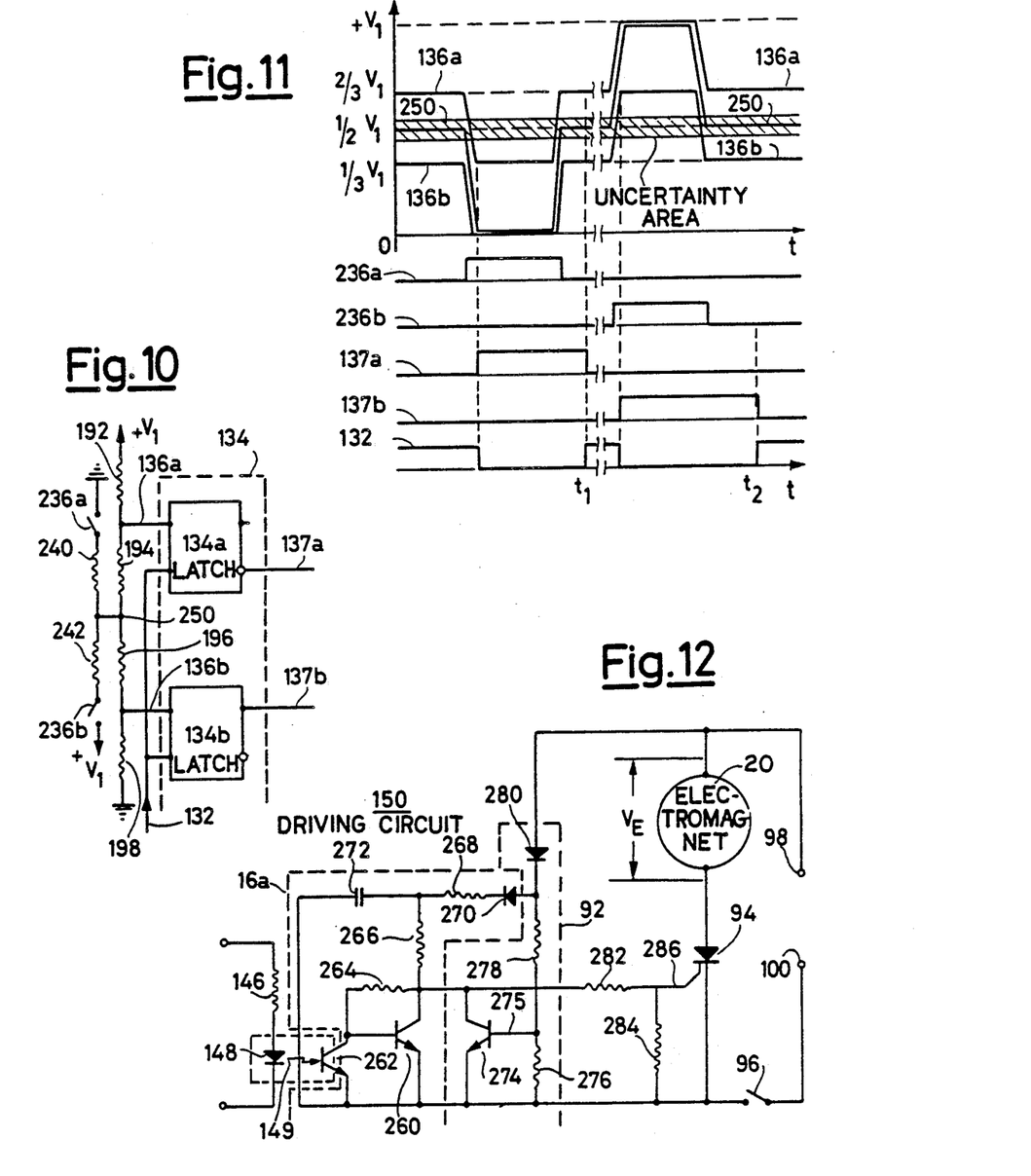
FIG. 10 is an example of a pair of memory members, of the kind depicted in FIG. 9, using a memory setting system comprising a minimal number of connections to outside members.
FIG. 11 shows a graphical representation of diagrams illustrating the FIG. 10 circuit operation.
FIG. 12 is a circuit diagram of an embodiment of a pump electromagnet driving circuit, corresponding to the block diagram shown in FIG. 5 and also mentioned and shown in FIG. 9.

The same FIG. 11 depicts also the operation of the memory blocking signal appearing on the terminal 132, also depicted in FIGS. 6, 7, 9 and 10. It is known that said memory blocking signal is high when the bistable circuit 126 is deactuated or reset and is low when it is actuated or set and the specific memory 134 is so made that when the blocking signal is high the memory members 134a-134b are transparent, i.e., the state of their output becomes equal to the state of their input, while when the blocking signal is low the memory members are locked or i.e., they maintain the state given by their input before said locking signal becomes low.

Thus when the contact pair 236a is closed the output 137a of the memory member 134a becomes high actuating or setting the bistable circuit 126, after the delay imposed by the delay circuit 142, said actuation remaining until all the pump strokes corresponding to the desired metered volume have been carried out, lowering the memory blocking signal 132 retaining the output states of the memory members 134a-134d, i.e. in this case maintaining high the output 137a of the memory member 134a and low the output 137b of the memory member 134b.

When the time $t_1$ corresponding to the preset pump stroke number has elapsed, the bistable circuit 126 is deactuated or reset, making still high the state of the blocking signal on the terminal 132 still higher and thus making transparent the memory members 134a–134d. In this case, as the contact pair 236a is reopen, the output 137a of the memory member 134a takes again the inverse of the state of its input 136a and thus no actuating signal is anymore sent to the bistable circuit 126.

When the contact pair 236b is closed, the voltage on the terminal 250 rises from $\frac{1}{2} V_1$ to $+V_1$, that on the terminal 136a rises from $\frac{2}{3} V_1$ to $+V_1$ and that on the terminal 136b rises from $\frac{1}{3} V_1$ to $\frac{2}{3} V_1$. Thus the state of the terminal 136a remains high, while the state of the terminal 136b changes from low to high. Being at this time the signal on the terminal 132 is high, the high state on the input of the terminal 136b of the memory member 134b is transferred to its output terminal 137b, emitting an actuating or setting signal for the bistable circuit 126. When the bistable circuit 126 has been actuated, the locking signal on the terminal becomes low, retaining the state on the output terminal 137b of the memory member 134b and maintaining it until it remains low in a perfectly equivalent way with what happened for the signal on the output terminal 137a of the memory member 134a.

FIG. 10 depicts also a simple provision to avoid possible misfunctions deriving from a contemporaneous closure of both contact pairs 236a and 236b. Said provision consists in inserting two resistors 240 and 242, respectively each having an equal resistance value which is a very small fraction of the resistance of resistors 192–198. As an example of practical values these resistances would be 100K ohms for the resistor 192 and 198, 47K ohms for the resistors 194 and 196 and 2.7K ohms for the resistors 240 and 242. The presence of said resistors 240 and 242 should not have any substantial effect on the state of the input terminals 136a and 136b, when just one contact pair 236a or 237b is closed, while in the case of contemporaneous closure of both contact pairs, the equal resistances of the resistors 240 and 242 should not change the voltage level on the terminal 250 which would remain at the same level of $+\frac{1}{2} V_1$ which is already preset when both the pairs 236a and 236b are open. The only consequence is some current through the resistors 240 and 242 which, however, can be limited to absolutely bearable levels with a proper selection of their resistance (for example to the above indicated values).

Figure 13:
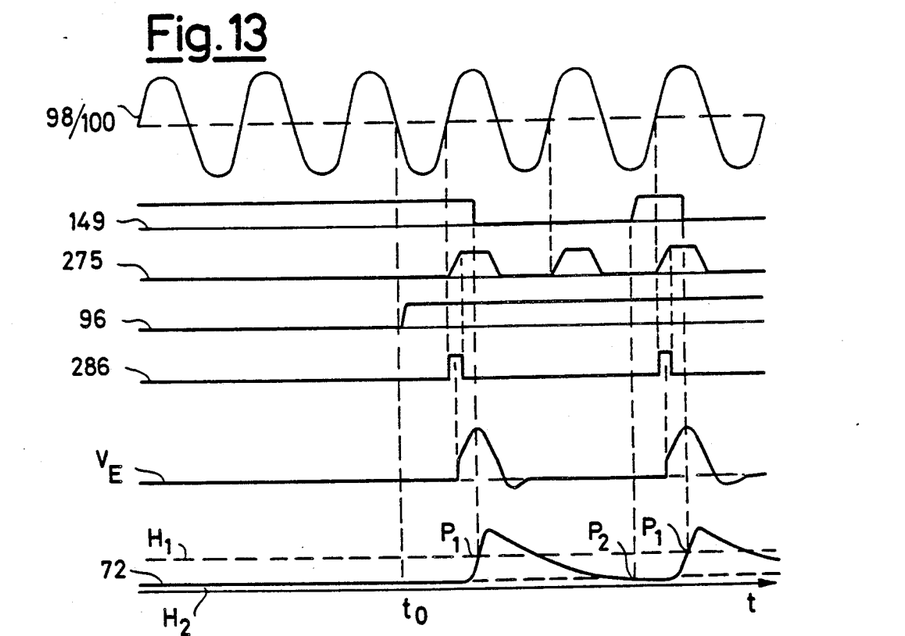
FIG. 13 shows graphical diagrams illustrating the FIG. 12 circuit operation.

Reference is now made to FIGS. 12 and 13 respectively depicting a preferred embodiment of the driving circuit 150 of the electromagnet 20 shown in FIG. 9 and its operation.

Referring to FIG. 12, said driving circuit 150 comprises an enabling gate 16a, controlled by a light signal emitted by the diode 148 through the optical path 149, comprising a transistor 260 whose base is driven by the collector of a phototransistor 262 forming with the light emitting diode 148 an optical coupler loaded by a resistor 264 operating also as a bias and feed-back resistor connected between the collector and base of the transistor 260, said transistor having the collector connected to a load resistor 266 supplied by a rectifying circuit comprising a diode 270, a resistor 268 and a levelling capacitor 272. Near the enabling gate 16a a zero crossing detector 92 for the network AC voltage is formed comprising a transistor 274 having its emitter and collector commonly connected with the emitter and collector of the transistor 260 and a base 275 connected to a voltage divider, comprising resistors 276 and 278, connected through a diode 280 to a network terminal (e.g. the terminal 98). The collector of the transistor 274, connected in common with the collector of the transistor 260, is connected through a voltage divider, comprising resistors 282 and 284, to a gate 286 of the controlled rectifier (SCR) 94. With reference also to FIG. 13, let us consider the operation of said driving circuit 150.

When the electromagnet 20 is not crossed by current, the piston 72 is in the position nearest to the Hall effect magnetic detector so that said detector emits the high signal through the optical path 149. However, this signal does not have any effect until a request of pump actuation appears closing the contact pair 96 (time $T_o$). When this contact pair is closed, the network alternating voltage present on the terminals 98 and 100 is applied to the electromagnet 20 and SCR 94 assembly, as well as to the zero crossing detector 92. When a half wave of the network voltage occurs passing through the diodes 280 and 270, both the enabling gate 16A and the zero crossing detector 92 are fed. Being the light signal present in the optical part path 149, the phototransistor 262 of the optical coupler is saturated, meaning that the base of the transistor 260 is substantially shortcircuited with its emitter, interrupting the transistor 260 and allowing the appearance on the gate 286 of the SCR 94 of a pulse making conductive said SCR 94 through which SCR a current begins to pass as soon as the network voltage reaches such a level to allow the formation of a voltage $V_E$ on the electromagnet 20 and a substantial current I crossing through said SCR 94.

However the pulse on the gate 286 is time limited by the intervention of the transistor 274, on the base 275 of which a voltage is formed connected with the network voltage half wave saturating it, zeroing the voltage on the gate 286 and removing the control from the SCR 94. A current crossing through the electromagnet 20 and the SCR 94 causes the pump piston 72 to be displaced and removed from the Hall effect magnetic detector until the point $P_1$ (corresponding to the magnetic field strength $H_1$ of FIG. 4) where the output of the magnetic detector and thus the light signal on the optical path 149 goes to zero. The signal absence in the optical path 149 interrupts the phototransistor 262 and saturates the transistor 260 preventing the pulse formation on the gate 286 of the SCR 94 even when that is allowed by the half wave of the network voltage. In the meantime the piston 72 of the pump, pushed by the return spring, comes back to the starting position till a point $P_2$ (corresponding to the magnetic field strength $H_2$ of FIG. 4) in which the output of the magnetic detector, and thus the light signal through the optical path 149, are recovered.

As it is apparent from FIG. 13, if the piston 72 has not come back enough to allow the signal generation through the optical path 149, the positive half wave of the network voltage cannot provide a control pulse on the gate 286 of the SCR 94 preventing a current passage through the electromagnet 20, said control pulse being generated just when a light signal through the optical path 149 exists and thus when the piston has come back near enough to the magnetic detector to allow a complete stroke. The drive and control system of the present invention can also be embodied using a microprocessor, as depicted in FIG. 14, carrying out all the operations for presetting and counting metered liquid volumes to be delivered by the pump.

Figure 14:
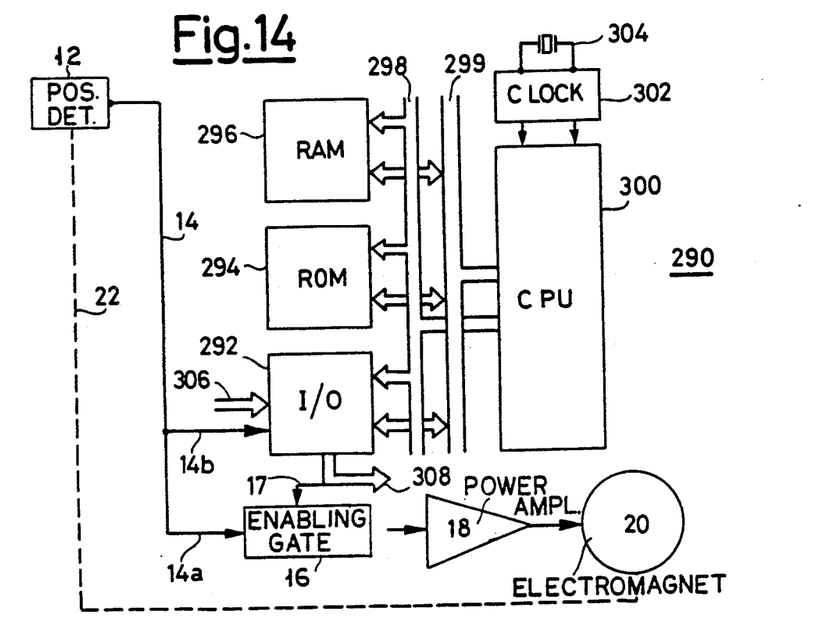
FIG. 14 shows a further embodiment of a metering pump driving system controlled by a microprocessor.

As depicted in FIG. 14, the electromagnet 20, the piston position detector 12, the enabling gate 16 and the power amplifier 18 assembly can be controlled through said enabling gate 16 by a microprocessor 290, said microprocessor comprising at least an input/output (I/O) port 292, a read only memory (ROM) 294, a random access memory (RAM) 296, an address bus 298, a data transfer bus 299, a central processing unit (CPU) 300, a clock 302, possibly stabilized by a quartz crystal 304, and input and output buses 306 and 308, respectively. The operation of the above mentioned microprocessor control 290 is the following:

Through the input bus 306 of the I/O port 292 the directions regarding the metered liquid volume to be delivered by the pump are forwarded to the central processing unit 300. The central unit 300, using the directions received from the I/O port 292, provides the instruction to extract from ROM 294 the information regarding the preselected voumes. Said information can be presented to the RAM 296 to extract from it the numerical data to be presented to the central processing unit 300. After the stroke number determination, the central unit 300 forwards to the I/O port 292 directions for enabling the gate 16 (for example through a branch 17 of the output bus 308 of said port 292). The actuation of the enabling gate 16 connects the branch 14a of the connector 14, coming out from the piston position detector 12, with the input of the power amplifier 18 which begins to drive the electromagnet 20 controlling through the mechanical fedback connection 22 the piston position detector 12.

The oscillations driving the pump piston are then established, causing the liquid pumping. When the oscillations have been established, the branch 14a of the connection 14 forwards pulses to the I/O port 292, the pulses corresponding to said oscillations, which are counted in the central unit 300 and their total number is compared with the total number stored in the RAM 296, corresponding to the desired liquid volume. When the pulse number totalized in the central unit 300 coincides with the number stored in the RAM 296, the central unit emits a stopping direction to the I/O port 292, which provides the instruction to forward said directions through the connection 17 to the enabling gate 16, stopping the electromagnet 20 drive, and simultaneously forwards through the output bus 308 directions to possible displays indicating the complete delivery of the desired liquid volume or in any case, the carrying out of the directions. Of course just some embodiments have been specified of the present invention not to be construded as limiting the most general principles thereof, being apparent that to people skilled in the art from the reading of the above description many equivalent solutions, can be apparent all to be meant as covered by the scope of the present application.

I claim:

1. A metering vibrating pump, comprising:
    a piston actuated by a movable core moveable in response to the activation of an electromagnet (20);
    a piston position detector (12) and a power amplifier (18) for driving said electromagnet (20);
    an enabling gate (16) between said piston position detector (12) and said power amplifier (18) enabling the driving of said electromagnet (20);
    a microprocessor (290) for carrying out and controlling all the functions of presetting and counting the desired liquid volumes to be supplied by said pump; and
    said microprocessor (290) comprising at least an input/output (I/O) port (292), a read only memory (ROM) (294), a random access memory (RAM) (296), an address bus (298), a date transfer bus (299), a central processing unit (CPU) (300), a clock (302, 304), and input and output buses (306, 308) from and to peripheral units, said central processing unit (CPO) being coupled through said input/output (I/O) port to said piston position detector means (12) for counting pulses coming therefrom.

2. The pump according to claim 1, wherein said microprocessor includes:
    means sending through the inputs buses of said I/O port (292) to the central processing unit (CPU) (300) the directions regarding a metered liquid volume to be supplied by said pump;
    said central unit (300) from the information received by said I/O port (292) extracting from said read only memory (ROM) (294) the information regarding preset metered volumes;
    said information being presented to said random access memory (RAM) (296) for extracting therefrom pump stroke numbers to be presented to said central processing unit (300) such that at the end of the phase determining the stroke number, the central processing unit (300) forwards to said I/O port (292) directions for enabling said enabling gate (16), such that said gate (16) thereby controlling the energization of said electromagnet (20).

3. The pump according to claim 2, wherein said electromagnet (20) upon energization thereof controls a pump piston position detected by said piston position detector (12) which said piston position detector in turn controls the energization of said electromagnet (20), and establishes oscillations allowing said liquid pumping, so that when said oscillations have been established, and arrive at said I/O port (292) pulses corresponding to said oscillations are counted in said central processing unit (300) and the total number of pulses counted is compared with the number recorded in said random access memory (RAM) (296), corresponding to a desired liquid volume, so that, when the pulse number totalized in said central processing unit (300) coincides with the number recorded in said random access memory (RAM) (296), said central processing unit (300) emits a stop direction to said I/O port (292), for stopping the energization of said electromagnet (20) and thus the pump actuation, and indicating displays for indicating the supply of a desired liquid metered volume.

4. In a metering pump of the vibrating kind for operating in a variable flow rate condition, comprising:
    electromagnet means (20) for displacement of a piston driven by a movable core;
    piston position detector means (12) and power amplifier means (18) coupled with said electromagnet means, and enabling gate means (16) between said piston position detector means and said power amplifier means (18) for driving said electromagnetic means (20);
    memory circuit means (36) coupled with said enabling gate means (16) set by energization starting signal means (38) for said electromagnetic means (20) through said memory circuit means (36) and said enabling gate means (16); and
    digital counter means (24) coupled to said piston position detector means (12) for counting pulses coming therefrom; and numerical comparator circuit means (28) coupled with said digital counter means (24) and numerical digital combinator means (32) for comparing numbers in digital format coming from said counter means (24) with numbers coming from said numerical digital combinator means (32) for supplying a number corresponding to desired metered volumes;

said numerical comparator circuit means (28) emitting a resetting signal from said memory circuit means (36) for stopping energization of said electromagnet means (20) when the number appearing at the output of said digital counter means (24) coincides with a number appearing at the output of said numerical digital combinator means (32); and said memory circuit means (36) further comprising supplementary reset input means (34) for arbitrarily stopping energization of said electromagnet means (20).

5. In the pump as claimed in claim 4, wherein said piston position detector means (12) has a hysteresis cycle sufficiently large to permit a safe and careful switching between a high logical state and a low logical state of said position detector means (12) at some piston positions.

6. In the pump as claimed in claim 4, wherein:

said power amplifier means (18) is supplied by a network AC voltage and contains a silicon controlled rectifier (SCR) for energizing said electromagnet means (20); and said enabling gate means (16) receives in addition to a signal coming from said piston position detector means (12), the following signals:

a signal (17b) of zero crossing of the AC network voltage, a true enabling signal (17a) transmitted from a numerating system circuit means (90) receiving a piston position signal (14b), a plurality of electromagnet energization starting signals (38a-38n; 38'), a numerical signal (30) for automatically resetting the liquid metered volume for stopping the electromagnet energization at the preset volume, and a possible signal (34') from said supplementary reset means for arbitrarily stopping the energization of said electromagnet means (20).

7. In the metering pump according to claim 4, wherein said numerical digital combinator means (32) is a keyboard device having the characteristics of digital remote control devices.

8. In the pump as claimed in claim 7, including:

starting signal means for providing a plurality of starting signals (38a-38n; 38') for said electromagnet means (20);

said memory circuit means (36) being left set by one preselected signal of said plurality of starting signals (38a-38n; 38') for said electromagnet means (20) from said starting signal means; and a plurality of numerical comparator means (46a-46n) being coupled to and receiving:

(a) in common the output (26) from said digital counter means (24);

(b) the output (30) of said numerical digital combinator means (32), comprising a first digital address signal for one of said numerical comparator means (46a-46n) and a second digital signal corresponding to desired metered volumes;

(c) an actuating or setting signal from actuating or setting signal means (39a-39n) associated with one of said electromagnet energization signals from said energization signal means (38a-38n); and (d) deactuating or setting signal (19) from said memory circuit means (36) for resetting thereof and denergization of said electromagnet means (20);

said numerical comparator means (46a-46n) including a plurality of units each emitting a resetting signal (34a-34n) for said memory circuit means (36) in order to stop the energization of said electromagnet means (20) when the output of a number appearing at said digital counter means (24) coincides with a number appearing at the output of said numerical digital combinator means (32) is forwarded to said numeral comparator means (46a-46n) actuated by said actuating or setting signal means (39a-39n) associated with said electromagnet means (20) by said energization starting signal means (38a-38n); and said supplementary reset input resetting means (34) resetting said memory circuit means (36) for arbitrarily disabling said enabling gate means (16) in order to arbitrarily stop the energization of said electromagnet means (20).

9. In the pump as claimed in claim 4, wherein said piston detector means (12) is a Hall effect position detector.

10. In the pump as claimed in claim 9, wherein said electromagnet means (20) includes a silicon controlled rectifier (SCR) (94) and said enabling gate means (16) is connected through an optical path (149) to said Hall effect piston position detector means (12) and zero crossing detector means (92) for a network voltage applied to said electromagnet means (20) for synchronizing the pump movement with said network voltage.

11. In the pump as claimed in claim 4, including:

memory means (126) for controlling the starting and stopping of said electromagnet means (20), and having one setting input (127) for said memory means (126) obtained by combining a logical OR function (140), a setting input (137a-137b) for different metered volumes, a setting input (128) for an arbitrary metered volume and two resetting inputs, one of said resetting inputs being connected to said different metered volumes and said one setting input (128) being connected to said arbitrary metered volume.

12. In the pump according to claim 11, wherein said resetting input for the different metered volumes comprises step function generator means including generators (110) for each of said metered volumes to be preset, said step function generators each producing steps of different heights, and including voltage comparator circuit means (124) comparing the voltage of the step signal with a preset reference voltage ($+V_R$), said comparator circuit means emitting a reset signal for said memory means (126) when said step function equals said reference voltage.

13. In the pump according to claim 12, wherein said generator (110) generates pulses having rigorously equal time length, derived from a piston detector, for charging circuit means including a capacitor (122) through a plurality of resistors (120a-120d) connectable through switching means (118) so that, by changing the time constant of said circuit means comprising said capacitor (122) and one of said resistor (120a-120d), wherein said time constant is much longer than the length of said pulses, the height of the single voltage step is changed, reaching the reference voltage (+$V_R$) with a higher pulse number for lower step heights in order to carry out the counting of preset pulse numbers.

14. In the pump according to claim 11, wherein said resetting input of the different metered volumes comprises a step function generator for each of said metered volumes to be preset; and including voltage comparator circuit means (124) for comparing the voltage of the step function with at least one reference voltage, said voltage comparator circuit means (124) emitting a resetting signal for said memory means (126) when said step function equals one of said reference voltages, operating as a counter and indicator of preset piston strokes.

15. In the pump according to claim 14, wherein said resetting input for the different metered volumes comprises said step function generator means, having a fixed step height, on said voltage comparator circuit means (124) comparing said step function with one of a number of reference voltages ($V_{R1}$-$V_{R4}$), one for each said metered volumes to be preset, said comparator circuit means (124) emitting a reset signal for said memory means (126) when said step function equals one of said reference voltages ($V_{R1}$-$V_{R4}$).

16. In the pump according to claim 15, wherein said step function generator means comprises a generator of pulses (110) having rigorously equal time length charging a time constant circuit composed of a capacitor (122) charged through a resistor (120), said time constant being longer than the time length of said pulses, so that each pulse forms a fixed voltage step and, depending on the reference voltage ($V_{R1}$-$V_{R4}$) selected through switching means (118), the necessary pulse number to reach said reference voltage ($V_{R1}$-$V_{R4}$) is changed.

17. In the pump according to claim 16, including a setting input (138) for arbitrary metered volumes, said setting input (138) interrupting said step function generator means so that the resetting can be carried out just through said one setting input (128) of arbitrarily metered volume resetting.

18. In the pump according to claim 17, wherein said interruption of said step signal generator is obtained by deactuating all said switching means (118) connecting said resistor plurality (120-120d) with said capacitor (122) for preventing forwarding equal time length pulses to charge said capacitor (122).

19. In the pump according to claim 17, including short circuiting means for interrupting said step function generator, said short circuiting means short circuiting said capacitor (122) for prevention thereof from being charged by said equal time length pulses and deactuating all said switching means (118) choosing the reference voltage, in order to impose on said voltage comparator circuit means (124) a non-reachable reference voltage to avoid said voltage comparator circuit means (124) from resetting said memory means (126).

20. In the pump as claimed in claim 16, wherein said switching means (118) for said step function generator means are controlled by memory means (134) settable on operated inputs (136a-136d) in a number equal to the number of metered volumes chosen and resettable at the end of every metering when resetting said memory means (126) for actuating the energization of said electromagnet means (20).

21. In the pump as claimed in claim 20, comprising:
a voltage divider for reducing the control connection number both to said memory means (126) controlling the starting and stopping of the energization of said electromagnet means (20) and said memory means (134) controlling said switching means (118);
said voltage divider comprising four resistors respectively connected in series between the supply voltage and ground; and
two external resistors of said series of four resistors having substantially double resistance with respect to that of the other two internal resistors;
the junction between the first and second resistors being connected to a first input, the junction between the third and the fourth resistors being connected to a second input, and the junction between the second and third resistors forming a control junction for said voltage divider and being connected to a control terminal switchable either to the supply voltage or to the ground voltage for producing respective high or low logical states for said first and second input.

22. In the pump as claimed in claim 20, wherein said memory means (134) controls said switching means (118) by connecting a selected one of a plurality of resistors (120a-120d) connected with said capacitor (122) to make said step function generator have settable step height.

23. In the pump as claimed in claim 22, wherein said memory means (134) controls said switching means (118) for connection thereof to a selected one of reference voltage plurality ($V_{R1}$-$V_{R4}$) to said voltage comparator circuit means (124).

* * * * *